United States Patent [19]

Lin

[11] Patent Number: 4,768,349

[45] Date of Patent: Sep. 6, 1988

[54] AUXILIARY COOLING DEVICE FOR THE CONDENSER OF AN AUTOMOBILE AIR CONDITIONER

[76] Inventor: Horng-Chyi Lin, No. 774, Chi Shan Road, Yunlin Li, Chushan Chen, Nan Tou Hsien, Taiwan

[21] Appl. No.: 101,384

[22] Filed: Sep. 28, 1987

[51] Int. Cl.[4] .............................................. B60H 1/32
[52] U.S. Cl. ...................................... 62/243; 62/244; 62/279; 62/305
[58] Field of Search ................. 62/243, 244, 305, 239, 62/279

[56] References Cited

U.S. PATENT DOCUMENTS

| | | | |
|---|---|---|---|
| 3,087,312 | 4/1963 | White | 62/244 X |
| 3,662,563 | 5/1972 | Sudmeier | 62/243 |
| 3,812,687 | 5/1974 | Stolz | 62/279 X |
| 3,872,684 | 3/1975 | Scott | 62/305 X |
| 3,926,000 | 12/1975 | Scofield | 62/305 X |
| 4,688,394 | 8/1987 | Waldorf | 62/244 X |

Primary Examiner—Lloyd L. King
Attorney, Agent, or Firm—Bacon & Thomas

[57] ABSTRACT

A condenser cooling device for an automobile air conditioner, and more particularly a water-operated auxiliary cooling means for accelerating the heat exchange rate of a coolant condensing device, mounted between a coolant reservoir and an expansion valve, and consisting of a housing, a heat exchanger, an air drawing means, a water reservoir, and a temperature-lowering tube. Cool water is pumped in a circular manner from the water reservoir to an elevated position above the heat exchanger and from which the cooled water is sprinkled through a tube having a plurality of water spraying bores down over the circular tube of the heat exchanger to assist the cooling of the air conditioner coolant. The cooled air from the air-conditioned room is passed through the heat exchanger by an air drawing device to accelerate the thermal exchange process in the heat exchanger.

3 Claims, 2 Drawing Sheets

AUXILIARY COOLING DEVICE FOR THE CONDENSER OF AN AUTOMOBILE AIR CONDITIONER

BACKGROUND OF THE INVENTION

The present invention provides an auxiliary condenser cooling device for particular use in the air conditioner system of an automobile, and particularly relates to a water-cooling auxiliary device for accelerating the thermal exchange rate in the heat exchanger of the air conditioner and thereby enhance air conditioning performance.

It is well known that an air conditioner adapted for automobile is mainly operated on a condenser 1 as shown in FIG. 1 which is a kind of heat exchange means and serves to remove the heat of the gasified coolant, compressed by a compressor 2 into a high temperature and pressure state, thus condensing the gasified coolant into high-pressure liquid coolant at its normal temperature, with all the heat so absorbed from the gasified coolant being removed and ejected into the atomosphere.

In such type of condenser 1, if the circulation of the cooling air is insufficient, the thermal exchange efficiency becomes poor, and the collected heat from the compressor 2 as well as the evaporator 3 is not able to be sufficiently removed therefrom via the condenser into the atmosphere. As a result of the poor heat exchanging condition, the gasified coolant can not be liquefied satisfactorily, thereby causing the air cooling process to become inefficient.

To improve the air circulation in the heat exchanger, generally, a 6-vane fan is used in place of a 4-vane fan to increase the amount of delivered air at the cost of increasing engine burden and fuel consumption. The addition of vanes can supply more cooling air to the condenser, but the thermal exchange in the air conditioner is not accordingly improved, especially under hot and dry conditions. In such case, the air conditioner can not function well and cooled air cannot be produced instantly or even at all. In case of a rainy day, the air contains more moisture than usual, and that helps a great deal to increase the efficiency of the thermal exchange taking place in an air conditioner, thereby resulting in the common experience that an air conditioner produces cooler air under such circumstance.

SUMMARY OF THE INVENTION

The primary object of the present invention is to provide an auxiliary condenser cooling device which is installed between the coolant reservoir and the expansion valve and consists of a housing, a heat exchanger, an air drawing means, a water reservoir and a temperature-lowering tube; wherein cooling water in said reservoir is pumped out and delivered to the top of the heat exchanger, received in the housing, and sprinkled down therefrom through a porous tube having a plurality of tiny bores, and in the meanwhile, cooled air is drawn from the air-conditioned space and blown on the heat exchanger to further assist in fast cooling of the coolant so as to expedite the air cooling process in the air-conditioned space in the automobile without increasing the burden on the engine, thereby increasing the working efficiency of the compressor and reducing fuel consumption.

A further object of the present invention is to provide an auxiliary condenser cooling device for automobile use, wherein a water sprinkling tube, having a plurality of bores disposed on the wall thereof, is located on the top of a housing and coupled to the outlet pipe of the water pump of the water reservoir, and at the bottom of said housing is provided with a pair of water exit pipes connected to the top of said water reservoir to form a water circulating system, with the sprinkled water from said porous tube being recycled continuously.

A still further object of the present invention is to provide an auxiliary condenser cooling device wherein the outlet pipe of the water pump of said water reservoir is coupled to said water-sprinkling tube with an intermediate temperature lowering tube disposed therebetween so that the circulated water can be further cooled by means of circulated air conditioner coolant flowing through a tube contained within and going through said temperature-lowering tube, thus further dropping the temperature of the sprinkled water accordingly.

Another object of the present invention is to provide an auxiliary condenser cooling device; wherein a housing is provided with an air drawing pipe at the front thereof which is extended into the air-conditioned space of the automobile to extract cooled air therefrom, by an air drawing means, to blow on said heat exchanger so as to expedite the heat exchange thereof and assist in the circulation of air in the air-conditioned space.

To make the present invention more understandable of its structure and operation, a number of drawings are shown accompanied by a detailed description of a preferred embodiment of the invention in which;

DETAILED DESCRIPTION OF THE PREFERRED EMBODIMENT

Figure 1:
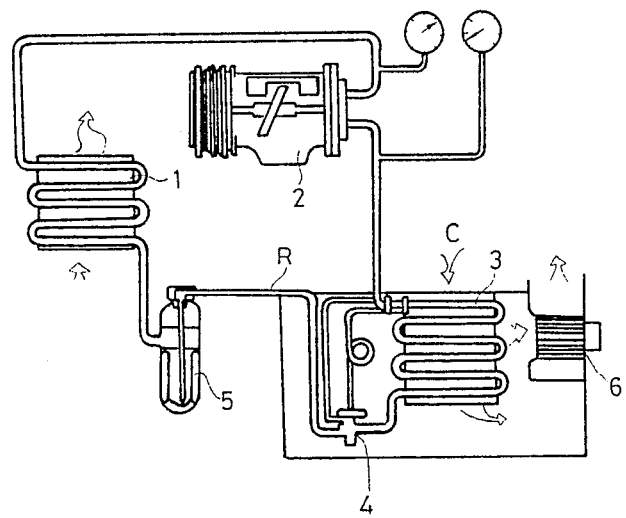
FIG. 1 is a diagram showing a conventional air conditioner used in an automobile.
Figure 2:
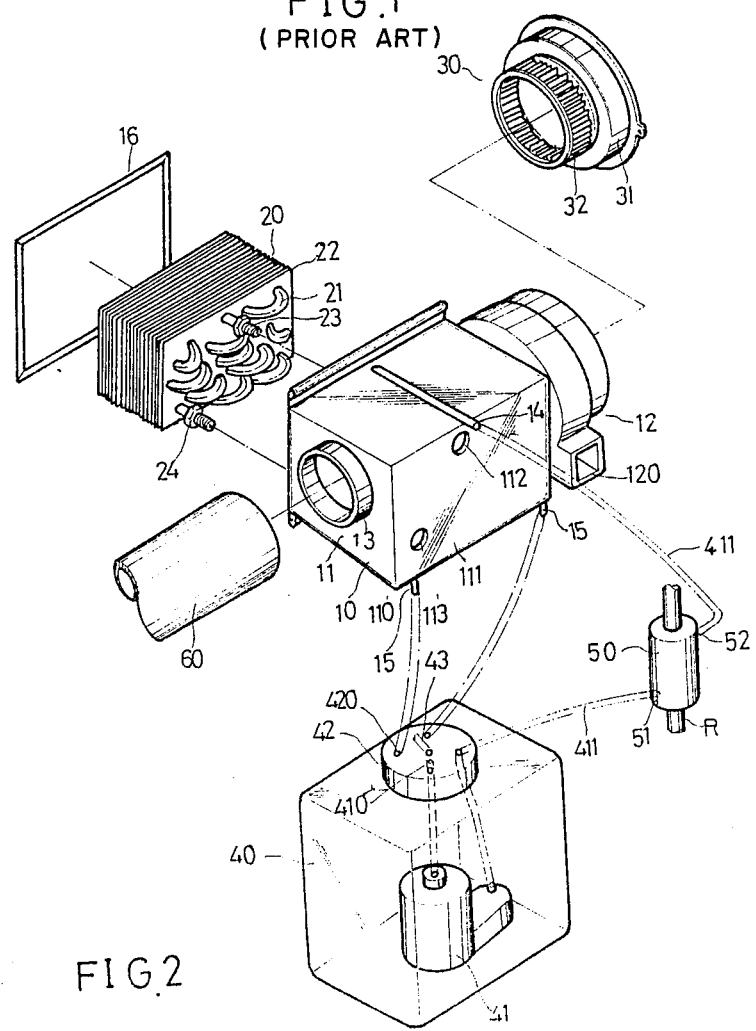
FIG. 2 is an exploded perspective view of an auxiliary condenser cooling device according to the invention

With reference to FIG. 2, the present auxiliary condenser cooling device mainly consists of a housing 10, a heat exchanger 20, an air drawing means 30, a water reservoir 40 and a temperature lowering tube 50.

Said housing 10 includes a box-shaped container 11 having a bevel bottom side 110 and a cylindrical portion 12 with an air outlet port 120 disposed at the wall near the bottom thereof in an outward projecting manner; a pipe connector 13 is disposed on the left side wall with a central hole going therethrough, and a pair of holes 112, 113 are disposed on the front wall 111 at the top and bottom thereof in a an offset relationship with respect to each other for disposition of the inlet and outlet pipes R of the circulating coolant of the air conditioner system of the automobile. A porous tube 14 is transversely located on the top of said housing 10, and a pair of water outlet ports 15 are disposed near the front edge at the bottom side of housing 10.

Heat exchanger 20 is made, in combination, of a wound pipe 21 of aluminum alloy and a plurality of parallel heat-diffusing plates 22, disposed in transverse relationship with said pipe 21, with the coolant inlet and outlet 23 and 24 extending on the front side thereof and going through said holes 112, 113, in assembly, so that the external pipes R can be coupled to the heat exchanger 20, thereby joining said heat exchanger 20 to the air conditioner circular system. A side cover 16 is used to close said container 10.

The air drawing means 30 is comprised of a high-speed motor 31 and a turbo fan 32, both of which are disposed within said cylindrical extended right portion 12 of said container 11 with said turbo fan 32 facing air outlet port 120.

Said water reservoir 40 is placed at a lower position with respect to said housing 10 with a water pump 41 disposed therein. A cap 42 having five bores 420 disposed thereon is removably located on the top of said reservoir 40. One of said five bores is for the passing through of an electric wire 410 of the water pump 41, two of which are for the insertion of said two water outlet pipes 15, and one for the disposition of a water compensation tube 43 and the last one is for the water outlet pipe 411 from said water pump 41.

Figure 3:
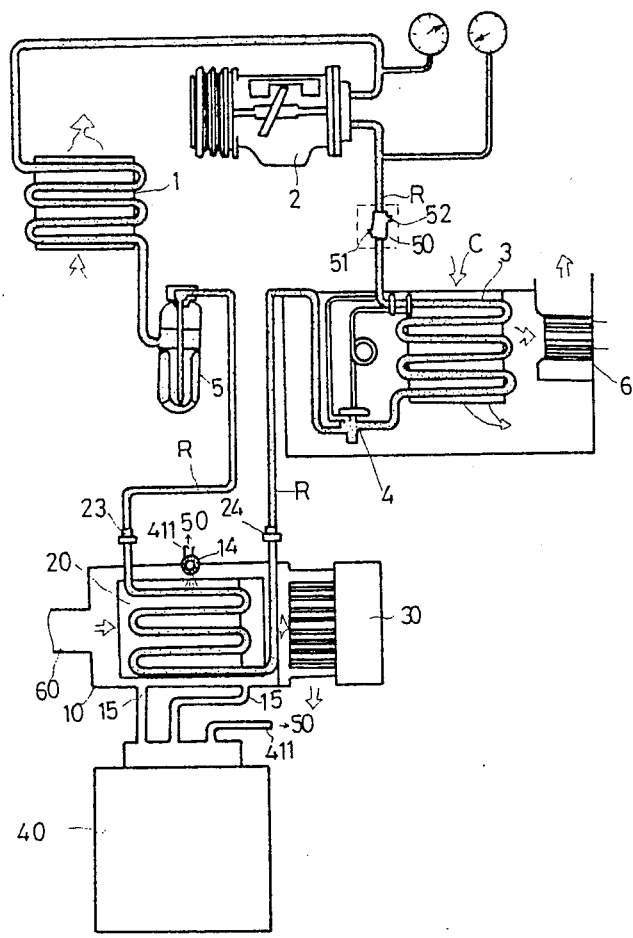
FIG. 3 is a diagram showing the installation and operation of the present invention.

Said temperature-lowering member 50 is in a tubular form and is located between an evaporator 3 and a compressor 2, enclosing a portion of the coolant circulating pipe R as shown in FIG. 3, and a water inlet 51 and outlet 52 are formed thereon, with the former coupled, by a tube 411 to the water pump outlet port of said water reservoir 40, and the latter connected to the water sprinkling tube 14 on said housing 10 by another tube 411.

As shown in FIG. 3, a pipe 60 is coupled to said housing 10 by means of said pipe connector 13 on the left side wall of said housing 10 and extends into the air conditioned space C of the automobile; said heat exchanger 20 is coupled to the coolant reservoir 5 by a tube R which is connected to one coupling end of tube 23 of said heat exchanger 20 and the other coupling end of tube 24 is coupled to another external coolant tube R. This serves to associate the present heat exchanger 20 with respect to the coolant circulating system of a conventional air conditioner so that, as long as said motor 31 of the air drawing means 30 and said water pump 41 are started, the present auxiliary condenser cooling device begins to assist the air conditioner in its heat diffusion process.

With reference to FIG. 3, when the air conditioner is actuated to function, a compressor 2 begins to work on the circulating coolant which serves to remove heat from an air-conditioned space. The heat absorbed by said circulating coolant is then "squeezed" by said compressor 2 into the atmosphere.

The coolant, before entering the condenser 1, is in a high temperature and high pressure gas state, as a result of taking in much heat from an air conditioned space, thereby causing the coolant to be converted from a liquid state into a gas state through evaporation. The gasified coolant is transformed into high-temperature and pressure liquid form after going through the said condenser 1. The liquefied coolant is separated from coolant in a gas state when flowing into a coolant reservoir 5, and the liquefied coolant is pumped out therefrom for recycling.

The present auxiliary condenser cooling device is intended to be disposed next to said coolant revservoir 5 with its coolant outlet coupled to the inlet end tube of heat exchanger 20 of the present auxiliary cooling device so that the thermal exchange process can be carried out in a faster and more complete manner, thus effectively improving the efficiency of said compressor 2 is.

By sprinkling water from said porous tube 14 on the said heat exchanger 20, heat is removed from the heat exchanger by evaporation; and in the meanwhile, cooled air is drawn from the air conditioned space to blow away the evaporated moisture into the atomosphere, thereby improving the ventilation of the air conditioned space. Thus the coolant undergoes a fast and efficient cooling process to reach an ideal working temperature, after which it flows next into an expansion valve 4 and into an evaporator 3 in a restricted manner so that the coolant can undergo a satisfactory evaporation process. A fan 6 is provided to blow cooler air into the air conditioned space in the automobile. Efficient coolant evaporation is vital to the efficiency of an air conditioner and reduces fuel consumption.

Figure 4:
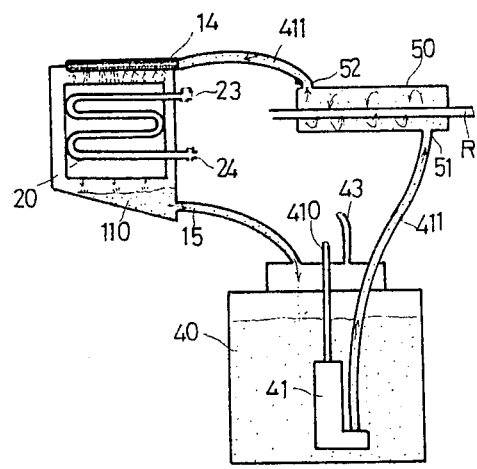
FIG. 4 is a diagram showing the cooling water circulation path of the present invention.

As shown in FIG. 4, the circulating water in the present auxiliary device is delivered from the water reservoir 40 by a pump 41, first going through a temperature-lowering member 50, and then to said porous sprinkling tube 14. The used water is collected and guided into said water reservoir 40 through tubes 15. A water compensation tube 43 is coupled to said water reservoir for supplying additional water to compensate for the water lost through evaporation.

The re-collected water is slightly high in temperature. To lower the temperature of the circular water before it is delivered to the sprinkling tube 14, a temperature-lowering member 50 is provided water going through member 50 has partial heat removed therefrom by a section of a coolant tube disposed in member 50, and the cooled water is then delivered to said water sprinkling tube 14 via the water outlet port 52 so that a complete and efficient thermal exchange system is established.

What is claimed is:

1. An auxiliary cooling device for the condenser of an automobile air conditioner comprising:
    (a) a housing defined by a box-shaped container including a bottom side, a right side wall, a cylindrical portion extending from the right side wall, an air outlet port disposed at one side of the cylindrical portion adjacent the bottom side, the container being provided with a pipe connector on a left side wall thereof and a pair of spaced holes for connecting the inlet and outlet tubes of a heat exchanger disposed on a front wall of the housing to the container, a porous water sprinkling tube positioned at the top central portion of the container, and a pair of water outlet tubes disposed adjacent one edge of the bottom side;
    (b) the heat exchanger being made of aluminum alloy and including a wound tube, a plurality of parallel heat diffusing plates, a coolant inlet and a coolant outlet provided on a front side of the exchanger, the exchanger being housed within the box-shaped container, the coolant inlet and outlet being coupled to external coolant circulating tubes through the spaced holes of the front wall of the container, and a cover plate defining a rear side wall of the container;
    (c) an air drawing means including a high-speed motor and a turbo fan disposed within the cylindrical portion of the container, the turbo fan being located adjacent the air inlet port of the cylindrical portion;

(d) a water reservoir disposed below the housing and provided with a water pump therein, a removable cap disposed on the top of the reservoir, the cap being provided with five bores therethrough, one bore receiving an electric wire therethrough for powering the pump, two bores receiving the two water outlet tubes from the housing, one bore being coupled to a water compensation tube, and the remaining bore receiving the outlet tube of the water pump;

(e) a temperature lowering tube disposed between the heat exchanger and the water reservoir for enclosing a section of the coolant circulating tube and defining a water inlet port and a water outlet port disposed at a front end and a rear end thereof, wherein the outlet tube of the water pump is coupled to the water inlet port, and the water outlet port of the tube is connected to the porous water sprinkling tube disposed in the housing; and (f) wherein when an air drawing pipe is coupled to the pipe connector of the housing and extends into the air-conditioned space of an automobile, and the outlet tube of the coolant reservoir of an air conditioner is coupled to the inlet end of the heat exchanger and the outlet end of the heat exchanger is connected to the coolant-circulating pipe line of the air conditioner, improvement in the thermal exchanger efficiency of the air conditioner is realized during operation of the air drawing means motor and the water pump.

2. The device of claim 1 wherein the compensation tube of the water reservoir may be coupled to the water outlet of the evaporator of an air conditioner for supplying extra water to the water reservoir, thereby compensating for the water evaporated during the heat exchange process.

3. The device of claim 1 wherein the temperature-lowering tube is configured to permit a section of the coolant circulating tube of an air conditioner to pass therethrough, thereby providing continuous circulation of temperature coolant therethrough for further cooling water circulated through the temperature lowering tube before the water is passed to the sprinkling tube.

* * * * *